J. J. OOSTERHOUS.
ATTACHMENT FOR PLOWS.
APPLICATION FILED MAR. 1, 1913.
1,089,005.
Patented Mar. 3, 1914.
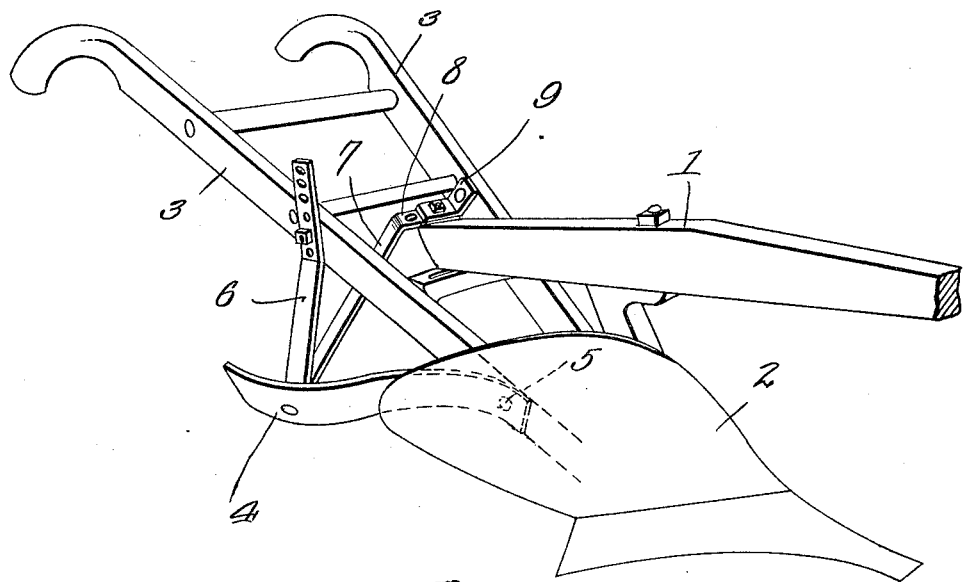
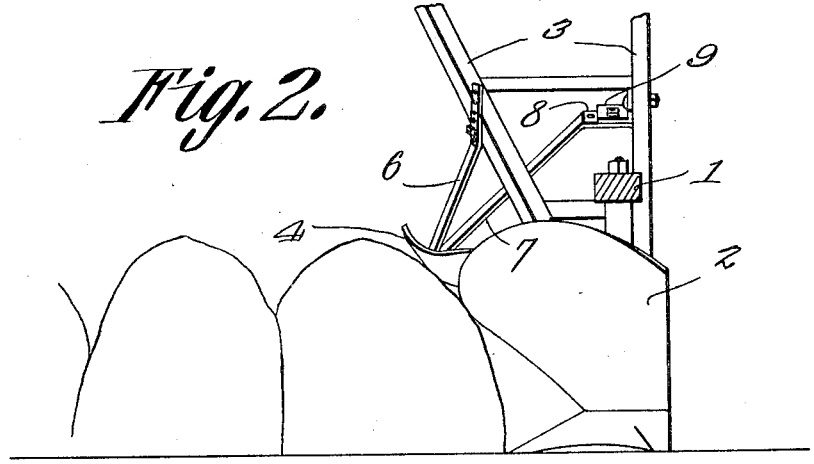
Jacob J. Oosterhous
Inventor,
Witnesses
by C. A. Snow & Co.
Attorneys.

UNITED STATES PATENT OFFICE.

JACOB J. OOSTERHOUS, OF PLYMOUTH, WISCONSIN.

ATTACHMENT FOR PLOWS.

1,089,005.  Specification of Letters Patent.  Patented Mar. 3, 1914.

Application filed March 1, 1913. Serial No. 751,659.

*To all whom it may concern:*

Be it known that I, JACOB J. OOSTERHOUS, a citizen of the United States, residing at Plymouth, in the county of Sheboygan and State of Wisconsin, have invented a new and useful Attachment for Plows, of which the following is a specification.

This invention relates to an attachment for plows.

Heretofore, in plowing through sod it has been difficult, especially when the sod is dry, to effect the complete turning of the sod or furrow slice and, in order to keep the sod in place after the plow has passed, it has been necessary for the operator to tread on the sod and push it laterally. This obviously has been a great inconvenience and has rendered plowing undesirably difficult under the conditions mentioned.

One of the objects of the present invention is to provide a supplemental turning attachment which can be applied readily to an ordinary plow and which, during the forward movement of the plow, will engage the furrow slice as it leaves the moldboard and press it laterally, thus giving a supplemental turn to the slice so that the sod will not fall back into the furrow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a perspective view of a plow having the present improvements combined therewith. Fig. 2 is a front elevation of a portion of the plow and attachment.

Referring to the figures by characters of reference 1 designates the beam of the plow and 2 designates the moldboard, the beam and moldboard being of the usual or any preferred construction. Handles 3 diverge rearwardly as ordinarily and the attachment constituting the present invention is connected to these handles.

This attachment includes a turning plate 4 which is elongated and given a substantially one-third twist so that when one end of the plate is secured to one of the handles 3, the other or outer end of the plate will be inclined upwardly and laterally. The inner end of the turning plate 4 is attached to one of the handles in any preferred manner as by means of a bolt 5 and this plate extends rearwardly and laterally from the plow to constitute an extension of the moldboard. Connected to the upper surface of the plate at a point between its ends are upwardly diverging braces 6 and 7. The brace 6 is shorter than the brace 7 and is adjustably connected to the outer side of the handle 3 to which the plate 4 is attached. The other brace has a laterally projecting extension 8 adjustably connected to the bracket 9 which is secured to the other handle 3.

It will be apparent that when the turning attachment is in position, the furrow slice while being turned by the moldboard 2 will be contacted by the plate 4 and this plate, by reason of its peculiar contour, will impart a supplemental turn or lateral pressure to the upper portion of the slice so as to push the slice laterally away from the furrow. At the same time the outer end portion of the plate 4 will bear downwardly on the slice, thus packing the slice onto the previously turned one and thereby positively preventing the turned sods from falling back into the furrow. By providing braces 6 and 7 which are adjustable in the manner shown, the attachment can be adapted to different sizes of plows, the adjustment of the handles being permissible in view of the fact that the plate 4 is mounted to swing upon its bolt 5.

It is preferred to arrange the plate 4 at such a point that it will engage the slice immediately after leaving the moldboard 2 and before any portion of it has had an opportunity to drop back into the furrow.

What is claimed is:—

1. The combination with a plow including a moldboard and upwardly diverging handles, of a turning and packing attachment comprising an elongated plate ogee-shaped from end to end and slightly twisted, said plate having its front end pivotally connected to the outer side of one of the handles at a point close to and adjacent the inner side of the moldboard, said plate being extended laterally and rearwardly beyond the rear edge of the moldboard and the rear portion thereof constituting means for turning and pressing downwardly upon the overturned slice upon leaving the moldboard, and adjustable means for connecting the rear end portion of said plate to the respective handles.

2. The combination with a plow including a moldboard and upwardly diverging handles, of a turning and packing attachment comprising an elongated plate ogee-shaped from end to end and slightly twisted, said plate having its front end pivotally connected to the outer side of one of the handles at a point close to and adjacent the inner side of the moldboard, said plate being extended laterally and rearwardly beyond the rear edge of the moldboard and the rear portion thereof constituting means for turning and pressing downwardly upon the overturned slice upon leaving the moldboard, and adjustable means for connecting the rear end portion of said plate to the respective handles, one of said means being adjustable vertically and the other of said means being adjustable laterally.

In testimony that I claim the foregoing as my own, I have hereto affixed my signature in the presence of two witnesses.

JACOB J. OOSTERHOUS.

Witnesses:
C. F. BEMIS,
W. H. LIMBERG.

Copies of this patent may be obtained for five cents each, by addressing the "Commissioner of Patents, Washington, D. C."